March 8, 1966 W. RANK 3,239,741

CONTROL SYSTEM FOR A.C. MOTORS

Filed Dec. 3, 1962

Inventor:

Wolfgang Rank

3,239,741
CONTROL SYSTEM FOR A.C. MOTORS

Wolfgang Rank, Kronach, Upper Franconia, Germany, assignor to Loewe Opta Aktiengesellschaft, Berlin, Germany, a company of Germany Filed Dec. 3, 1962, Ser. No. 243,184
Claims priority, application Germany, Dec. 12, 1961, L 40,708
3 Claims. (Cl. 318—313)

Figure 1:
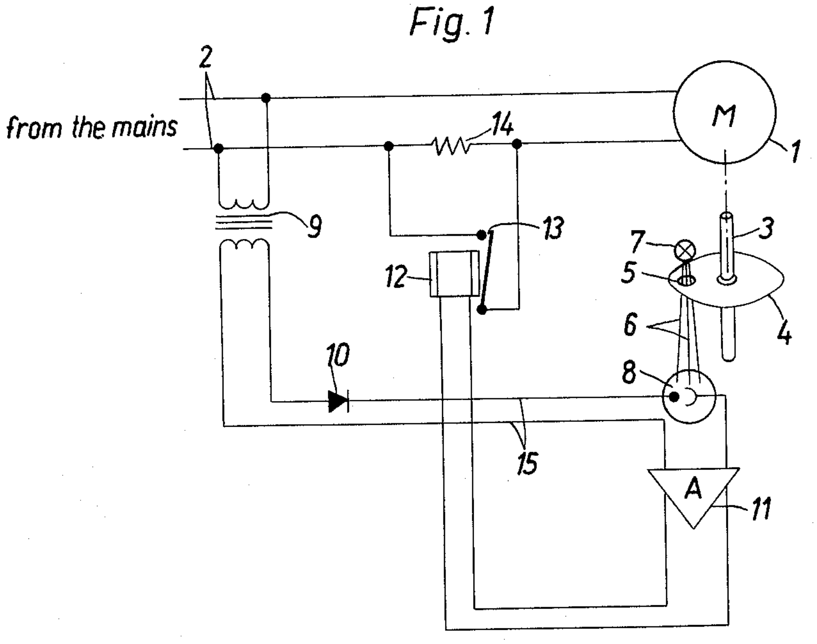

This invention relates to phase synchronising the rotor speed of an unpolarised synchronous motor together with the A.C. motor voltage in order to assure synchronism after starting the motor.

In the recording and reproduction of television image signals on a magnetic recording medium such as a tape it is usual for the tape to run past one or several magnetic recording-reproducing heads which are affixed to a rotating carrier. During recording of the image signals the image impulses and during image reproduction synchronising impulses recorded on the tape control the speed of the head-carrier motor. Accurate synchronising is only present when both speed and phase relationship of the head carrier motor is correct. For this reason synchronous motors have hitherto been used which perform this task satisfactorily.

It is an object of the present invention to incorporate as driving motor for a head carrier an unpolarised synchronous motor considerably cheaper than a polarised synchronous motor, such unpolarised synchronous motor, also being especially suitable for the present purpose because of its favourable damping properties and its high lock-in torque. This motor has, however, the disadvantage that it can rotate with its rotor locked in either of two phase-positions which are separated by 180°. When such a motor is used for the purpose referred to above the uncertainty as to the possible phase relationships of the rotor must therefore be eliminated.

In a control system for an unpolarised sychronous motor, in particular for driving a head carrier in a device for magnetic recording and reproduction of video images, this problem is according to the invention solved by a method consisting in rectifying the motor voltage, in supplying a subsequent photocell with said rectified voltage, in shortly illuminating said photocell once per revolution of the rotor, is producing a photoelectric current by said photocell only in case of phase synchronism and in energizing an electrical relay by said photoelectric current, a contact of said relay bridging a load resistance in the motor supply circuit.

To lighten the photocell in the stated manner, a rotor screen is provided having an aperture which passes a light beam of an incandescent lamp once per revolution of the rotor. If the semi-waves of the rectified voltage do not occur at the same time as the light beam pulses, then there is no photoelectric current flowing and the relay contact ceases to bridge the load resistance. This reduces the motor current, and the rotor speed is reduced so long until phase coincidence is restored and the load resistance is bridged. The automatic control of the phase relationship occurs in practice only once on switching on the motor, because following correct control the phase relationship remains constant as a result of the synchronous running properties of the motor.

Further details of the invention are explained with the aid of an exemplary design illustrated in the accompanying drawing.

FIG. 1 shows a basic circuit of the control system,

FIG. 2*a* to *d* the potential and current conditions at the photocell in phase coincidence, FIG. 3*a* to *d* the potential and current conditions at the photocell with phase difference.

An unpolarised synchronous motor 1 for driving a magnetic-head carrier not illustrated in a magnetic recording and reproducing set is connected to the A.C. mains 2 or with a power amplifier which in image recording amplifies the image impulses of the image signal and in reproduction amplifies the synchronising impulses derived from the recording tape. As the rotor of the motor can take up either of two different phase positions, at 180° to each other, when locked in synchronism with the rotation field optic-electrical means are provided which guide the rotor into a selected one of the possible positions. For this purpose a screen 4 fixed to the rotor 3 serves, through whose orifice 5 for each revolution of the rotor a light ray 6 from a source 7, e.g. an incandescent bulb, falls on to a photocell 8.

The operating voltage for the photocell is obtained from mains 2 through isolating transformer 9, a half-wave rectifier 10 and a photoelectric-cell amplifier 11.

Figures 2, 3:
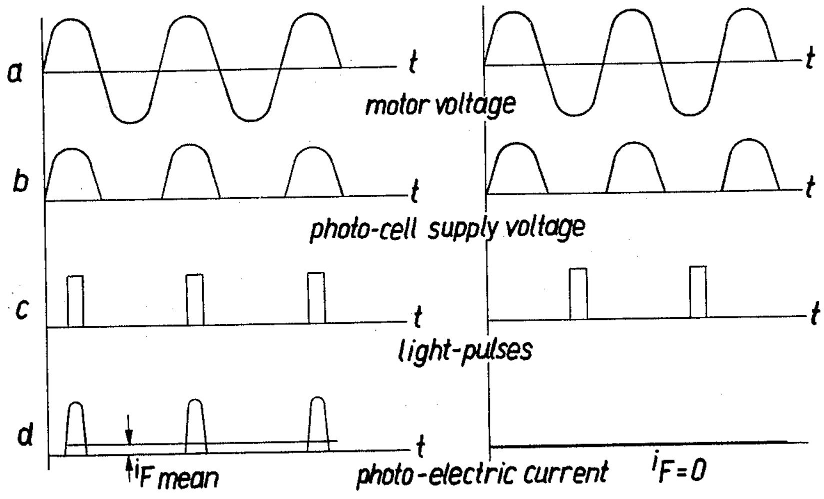

A photo-electric current only flows—as seen from FIGS. 2*a* to *d* and 3*a* to *d*—when the half-wave potential (FIG. 2*b*) obtained through the rectified motor supply potential (FIG. 2*a*) for supplying the photo-electric cell reveals the same phase relationship as the light-ray impulses (FIG. 2*c*). The photo-electric current (FIG. 2*d*) characterized by a D.C. mean value $i_{F\text{mean}}$ is amplified by the photo-electrical-cell amplifier 11 so that it is sufficient to control a switching relay 12. When photo-electric current flows, i.e. on the occurrence of inphase condition, a switch contact 13 of the relay bridges a motor load resistance 14, so that the motor is connected to full mains potential or power amplifier potential.

If the phase relationships of the stator potential and of the rotor do not coincide, no photo-electric current ($i_f=0$) flows as shown in FIGS. 3*a* to *d*, and relay 12 is cut out. Contact 13 opens and connects load resistance 14 into the motor circuit. The thus reduced motor current reduces rotor speed until inphase condition is restored and reaction resistance 14 is bridged. The reaction motor then again operates with its rotor in the proper phase position.

Instead of screen 4 a mirror can be fixed to the rotor shaft, which directs the light ray from source 7 on to photo-electric cell 8 only when the rotor is at a definite angle.

What I claim is:

1. In a system for recording and reproducing video signals on a magnetic tape by using a motor-driven rotating head, the speed of said motor being controlled by television synchronising signals, the method for producing a predetermined phase sychronism of the rotor speed of an unpolarised synchronous motor together with the A.C. motor-voltage only after starting the motor consisting in transforming the motor voltage by means of an isolating transformer, in rectifying the transformed voltage by means of a half-wave rectifier, in supplying a subsequent photocell with said rectified voltage, in shortly illuminating said photocell once per revolution of the rotor, in producing a photoelectric current by said photocell only in case of phase synchronism, and in energizing an electrical relay by said photoelectric current, a contact of said relay bridging a load resistance in the motor supply circuit.

2. In a system for recording and reproducing video signals on a magnetic tape by using a motor-driven rotating head, the speed of said motor being controlled by television synchronising signals, the method for producing a predetermined phase sychronism of the rotor speed of an unpolarised synchronous motor together with the A.C. motor-voltage only after starting the motor consisting in transforming the motor voltage by means of an isolating transformer, in rectifying the transformed voltage by means of a half-wave rectifier, in supplying a subsequent photocell with said rectified voltage, in shortly illuminating said photocell once per revolution of the rotor, in producing a photoelectric current by said photocell only in case of phase synchronism, in amplifying said photoelectric current, and in energizing an electrical relay by said photoelectric current, a contact of said relay bridging a load resistance lying in series with the motor supply circuit.

3. In a system for recording and reproducing video signals on a magnetic tape by using a motor-driven rotating head, the speed of said motor being controlled by television synchronising signals, the method for producing a predetermined phase synchronism of the rotor speed of an unpolarised synchronous motor together with the A.C. motor-voltage only after starting the motor consisting in an isolating transformer connected with the motor voltage, a half-wave rectifier, a photocell in series with said rectifier, a photoelectric current amplifier, and an electromagnetic relay energized by said amplifier; a load resistance lying in said motor supply circuit, a contact of said relay lying parallel to said resistance and incandescent lamp, a rotor-mounted disc with an aperture arranged to allow a light beam of said lamp to fall upon said photocell once per revolution.

References Cited by the Examiner

UNITED STATES PATENTS

| | | | |
|---|---|---|---|
| 2,281,954 | 5/1942 | Rinia | 318—313 X |
| 2,297,472 | 9/1942 | Hahn et al. | 318—437 X |
| 2,398,007 | 4/1946 | Hunter | 318—349 |
| 2,669,310 | 2/1954 | Haskins | 318—313 X |

ORIS L. RADER, *Primary Examiner.*

MILTON O. HIRSHFIELD, *Examiner.*

C. E. ROHRER, J. C. BERENZWEIG, *Assistant Examiners.*